May 3, 1932.  H. R. LORENTOWICZ ET AL  1,856,648
JOINT
Filed Nov. 10, 1930
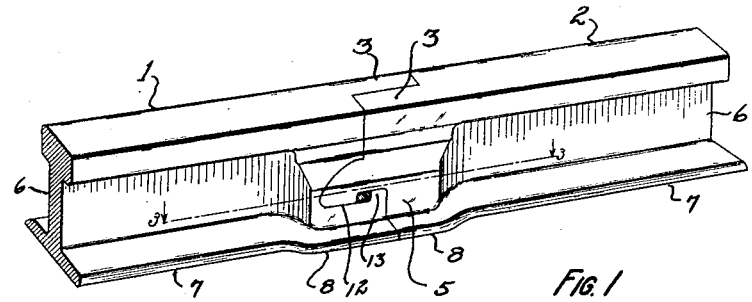
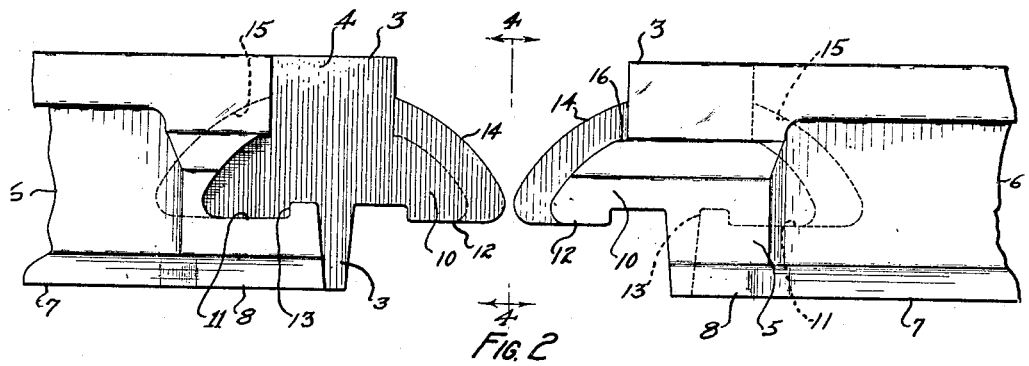
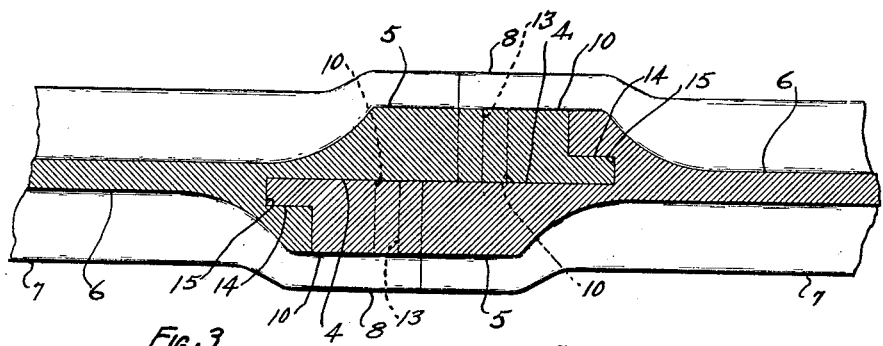
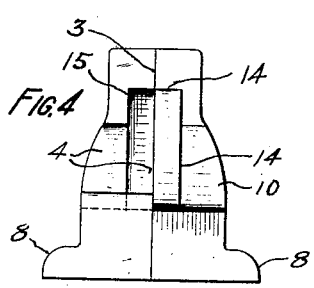
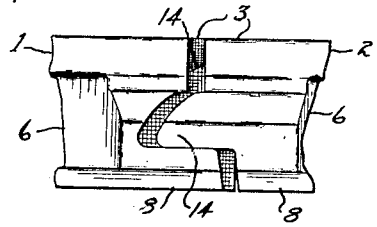
INVENTOR.
Henry R. Lorentowicz and
Henry E. Thompson,
BY George D. Richards
ATTORNEYS.

Patented May 3, 1932

1,856,648

UNITED STATES PATENT OFFICE

HENRY R. LORENTOWICZ, OF BLOOMFIELD, AND HENRY E. THOMPSON, OF NEWARK, NEW JERSEY, ASSIGNORS OF ONE-THIRD TO HERMAN WALDMAN AND CARL J. DUVENECK, PARTNERS TRADING AS WALDMAN & DUVENECK, OF NEWARK, NEW JERSEY

JOINT

Application filed November 10, 1930. Serial No. 494,528.

This invention relates, generally, to joints and the invention has reference, more particularly, to a novel joint for joining or connecting adjacent structural members, the said joint being especially suitable for use as a railway rail joint for joining adjacent rail sections.

Joints heretofore generally used for joining adjacent structural members employ fish plates that overlap the end portions of the structural members and are secured to these members as by bolts or rivets extending through apertures in the fish plates and in the members. Such joints are objectionable in that they are usually considerably weaker than the structural members which they connect and when used for connecting railway rails, the jarring and vibration of passing traffic ofttimes causes the bolts and fish plates to become loose, resulting in spreading joints and consequent danger of accidents.

The principal object of the present invention is to provide a novel joint which consists of similar halves or sections, each of said halves or sections being designed to be formed integrally with one of the structural members connected by the joint, said halves being constructed so as to readily interfit with one another to positively and rigidly connect the two structural members together without the use of any additional or separable fastening means, the said joint permitting relative expansion and contraction of the connected structural members, such as railway rails, while at the same time positively retaining said structural members, such as rail sections, in axial alignment.

Another object of the present invention lies in the provision of a joint of the above character which is of extremely simple construction and provides a double interlock for positively connecting the members that are interconnected by the joint, the said joint being relatively inexpensive to manufacture so that the halves having interfitting portions thereof, may respectively be formed integral with the respective members connected by the joint, or the same may be welded or otherwise rigidly secured to the structural members either at the time of manufacture of these members or at the time of installation.

Still another object of the present invention is to provide a novel joint which, when interconnecting two structural members, such as railway rails, provides overlapping portions or halves so that a car wheel in passing over the joint passes onto the overlapping portion of the advancing rail before the said wheel leaves the overlapping portion of the receding rail, whereby the same smooth running action is obtained as that present in an uncut rail, the wheel not being permitted to enter a cut joint such as at present in rail joints of the ordinary type.

Other objects of this invention, not at this time more particularly enumerated, will be clearly understood from the following detailed description of the same.

The invention is clearly illustrated in the accompanying drawings, in which:—

Fig. 1 is a perspective view showing end portions of adjacent railway rails interconnected by the novel joint of the present invention.

Fig. 2 is a view in elevation showing the opposed end portions of the rails spaced apart, slightly, preparatory to the interconnection of the joint of this invention.

Fig. 3 is a sectional view taken along line 3—3 of Fig. 1, looking in the direction of the arrows.

Fig. 4 is an end view of either of the rail sections shown in Fig. 2, said view taken along line 4—4 looking in the direction of the arrows; and Fig. 5 is a fragmentary view in elevation of a slightly modified construction.

Similar characters of reference are employed in all of the above described views, to indicate corresponding parts.

Referring now to said drawings, the reference numeral 1 designates one rail section which is interconnected to an adjoining rail section 2 by the novel joint of this invention. The novel joint comprises two similar halves or overlapping and interfitting end portions 3—3 which are formed upon the respective ends of the rails 1 and 2. The overlapping end portion 3 of each rail section projects into and interlocks with a conforming recess 4 provided in the other rail section. In forming the overlapping end portions 3—3 and the conforming recesses 4—4, the rail end portions are thickened at 5 in the region of the web 6. The bottom flange 7 is also preferably widened in the region of the joint as indicated at 8.

Each of the overlapping end portions 3 is of substantially one-half the thickness of the rail so that the upper surface of this end portion provides a car wheel engaging surface which is one-half the width of the rail surface, thereby providing ample wheel supporting area at all points of the joint. The car wheel in passing over the joint thus overlies the overlapping portion 3 of each said section and is supported substantially during its entire passage over the joint by the two rails acting jointly. Since there is no straight transverse break in the continuity of the wheel engaging rail surface, the wheel is continuously supported while passing over the joint and does not drop into any opening or open joint, such as is present in rails of the common type, thereby eliminating vibration, noise and the tendency of the connected rails to spread.

Each overlapping end portion 3 is formed with a nose projection 10 which is adapted to fit into a conforming portion of the recess 4 of the opposite rail section. In the form of the invention shown in Figs. 1 to 4 the under surface of the nose projection 10 is formed with a depending lug 12 which is slidably received and supported on a shelf 11 forming a lower wall of recess 4. Lug 12 is of lesser length than the length of shelf 11, as especially shown in Fig. 1, to provide for expansion and contraction of the rail sections 1 and 2 in use. An upwardly extending locking lip 13 is formed at the end of shelf 11 to prevent unwarranted or accidental separation of the rail sections 1 and 2. Locking lip 13 by engaging the depending lug 12 positively prevents the separation of the rail sections in use.

Each nose projection 10 is formed adjacent its inner surface with a nose shaped tongue or flange 14 which is of lesser width than the nose projection 10 and is slidably received in a conforming pocket or groove portion 15 of the recess 4. With the rails assembled as in Fig. 1, the tongue 14 always projects for a distance into the groove recess 15 regardless of whether the rails are fully expanded as shown in Fig. 1 or are fully contracted so that lug 12 engages locking lip 13. The tongues 14 of the nose projections 10 thus, by engaging in the grooves 15 of the rail ends, positively prevent transverse flexure of the rails 1 and 2 and cause these rails to withstand side pressure in the same manner as a single continuous integral rail.

The nose projection 10 of each rail section in resting upon the shelf 11 of the other rail section serves to support the overlapping projection 3 of the first rail section upon the other rail section, so that both rail sections contribute jointly in supporting a wheel passing over the joint regardless of the position of the wheel on the joint, thereby providing a stable continuous rail surface for the wheel so that rails connected by the novel joint of this invention operate in effect in the same manner as a continuous rail while at the same time providing for expansion and contraction of the rail sections.

The ample staggering or spacing longitudinally of the nose projections 10 of the respective rail sections from one another provides, in effect, a relatively lengthy bearing support for loads passing over the joint. Also, the relatively great staggering or spacing of the tongues 14 of the rail sections provides, in effect, relatively lengthy transverse bearing surfaces for positively preventing transverse flexure of the rail sections at the joint.

To assemble the rail sections at the joint, it is merely necessary to elevate the meeting ends of the rails at the joint so that the rail sections are inclined to each other, and, as the rails are moved toward each other while inclined, the nose projections 10 will pass over the locking lips 13 and slide into the conforming nose portions of the recesses 4. The rail ends are then lowered so that the rail sections move into alignment and the depending lugs 12 will engage with and are supported upon the shelves 11. The curvature of the upper surfaces of the nose projections 10 and of their tongues 14 greatly facilitates the assembling or disassembling of the rail sections.

In some installations and especially when using heavy rails, the locking lips 13 may be dispensed with as illustrated in Fig. 5. The action of the joint of Fig. 5 in supporting passing car wheels is exactly the same as that of the joint of the other figures. To assemble rails 1 and 2 of Fig. 5, it is merely necessary to move the rails longitudinally together as will be apparent.

It is obvious that the novel joint of the present invention may be used for connecting various structural members such as those used in building up temporary scaffolding used in buildings and elsewhere. In fact the novel joint of this invention may be used to advantage in any structural work. A small flattened area or portion 16 at the top of the nose projection 10, by conforming to a similar area of the nose portion of recess 4, serves, when the nose projection is fully inserted into the aperture 4, as illustrated in Fig. 1, to prevent the accidental or intentional unwarranted disconnection of the structural members connected by the joint. Thus, with the flattened portion 16 engaging the corresponding part of recess 4, the rails 1 and 2 cannot be turned relatively to one another to disconnected position. It is necessary to first slightly separate the rails before they can be turned to disconnected position. This is especially valuable in connecting vertical structural members as the weight of such members retains them closely abutting one another and hence they cannot be collapsed by side pressure from any direction.

It will be apparent that the novel joint of this invention may be formed integral with the rails 1 and 2 at the time of rolling these rails or the joint may be formed on separate pieces or sections and welded to the rails at the time of installation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A joint comprising a pair of opposed, similar sections, said sections having mutually overlapping end portions and conforming recesses provided in said sections for interlocking with said end portions, said end portions having nose projections with forwardly and downwardly curved upper surfaces, rounded forward ends, and flat under surfaces for cooperating with similar surfaces in said recesses, said nose projections serving to divide the weight of a load passing over said joint between the two sections.

2. A joint comprising a pair of opposed, similar sections, said sections having mutually overlapping end portions and conforming recesses provided in said sections for interlocking with said end portions, said end portions having nose projections formed intermediate the height of said end portions, said nose projections being provided with curved upper surfaces, rounded ends and flat under surfaces for cooperating with similar surfaces in said recesses, said nose projections serving to divide the weight of a load passing over said joint between the two sections, and tongues formed on said nose projections and extending forwardly of said projections, said tongues interfitting with conforming portions of said recesses for rigidly supporting said sections against transverse flexure at said joint.

3. A joint comprising a pair of opposed, similar sections, each of said sections having an end portion for overlapping with the end portion of the other section, said end portion being of substantially one-half the width of said section and having a nose projection with a forwardly and downwardly curved upper surface, said nose projection having a depending lug thereon, said section having a recess adjacent said end portion for receiving the end portion of the other section, said recess having a lower wall providing a bearing surface for the depending lug of the other section, whereby said sections are mutually supported on one another.

4. A joint comprising a pair of opposed, similar sections, each of said sections having an end portion for overlapping with the end portion of the other section, said end portion being of substantially one-half the width of said section and having an intermediate nose projection with a depending lug thereon, said nose projection having a curved upper surface extending upwardly and rearwardly from the forward end of said nose projection and terminating in a relatively small flattened area, said section having a recess adjacent said end portion for conformably receiving the end portion of the other section in interlocking engagement, said recess having a lower wall providing a flat bearing surface for the depending lug of the other section, whereby said sections are mutually supported on one another, and a locking lip projecting upwardly from said lower wall and cooperating with said depending lug for limiting the separation of said sections.

5. A joint comprising a pair of opposed, similar sections, each of said sections having an end portion for overlapping with the end portion of the other section, said end portion being of substantially one-half the width of said section and having an intermediate nose projection with a tongue thereon, said nose projection and said tongue having downwardly curved upper surfaces terminating in a flat under surface, said section having a recess adjacent said end portion for receiving the end portion of the other section, said recess having a lower wall providing a bearing surface for the flat under surface of said nose projection and a pocket portion for conformably receiving said tongue.

6. In a joint, the combination of two aligning sections having overlapping end portions, each of said end portions comprising a nose projection extending forwardly of the remainder of said end portion, said nose projection having a downwardly and forwardly curved upper surface terminating in a flat under surface, and a recess located rearwardly of and at the side of said nose projection for receiving the nose projection of the other section end portion, said recess having a downwardly and rearwardly curved upper surface and a flat bottom surface for conforming to the nose projection of the other section end portion.

7. In a joint, the combination of two aligning sections having overlapping end portions, each of said end portions comprising a nose projection extending forwardly of the remainder of said end portion, said nose projection having a downwardly and forwardly curved upper surface, terminating in a flat under surface, a tongue formed on said nose projection and projecting forwardly thereof, a recess located rearwardly of and at the side of said nose projection for receiving the nose projection of the other section end portion, said recess having a downwardly and rearwardly curved upper surface and a flat bottom surface for conforming to the nose projection of the other section end portion, and a pocket formed on the inner end of said recess for receiving the tongue of the other section end portion.

In testimony that we claim the invention set forth above we have hereunto set our hands this 8th day of November, 1930.

HENRY R. LORENTOWICZ.
HENRY E. THOMPSON.